Patented June 2, 1942

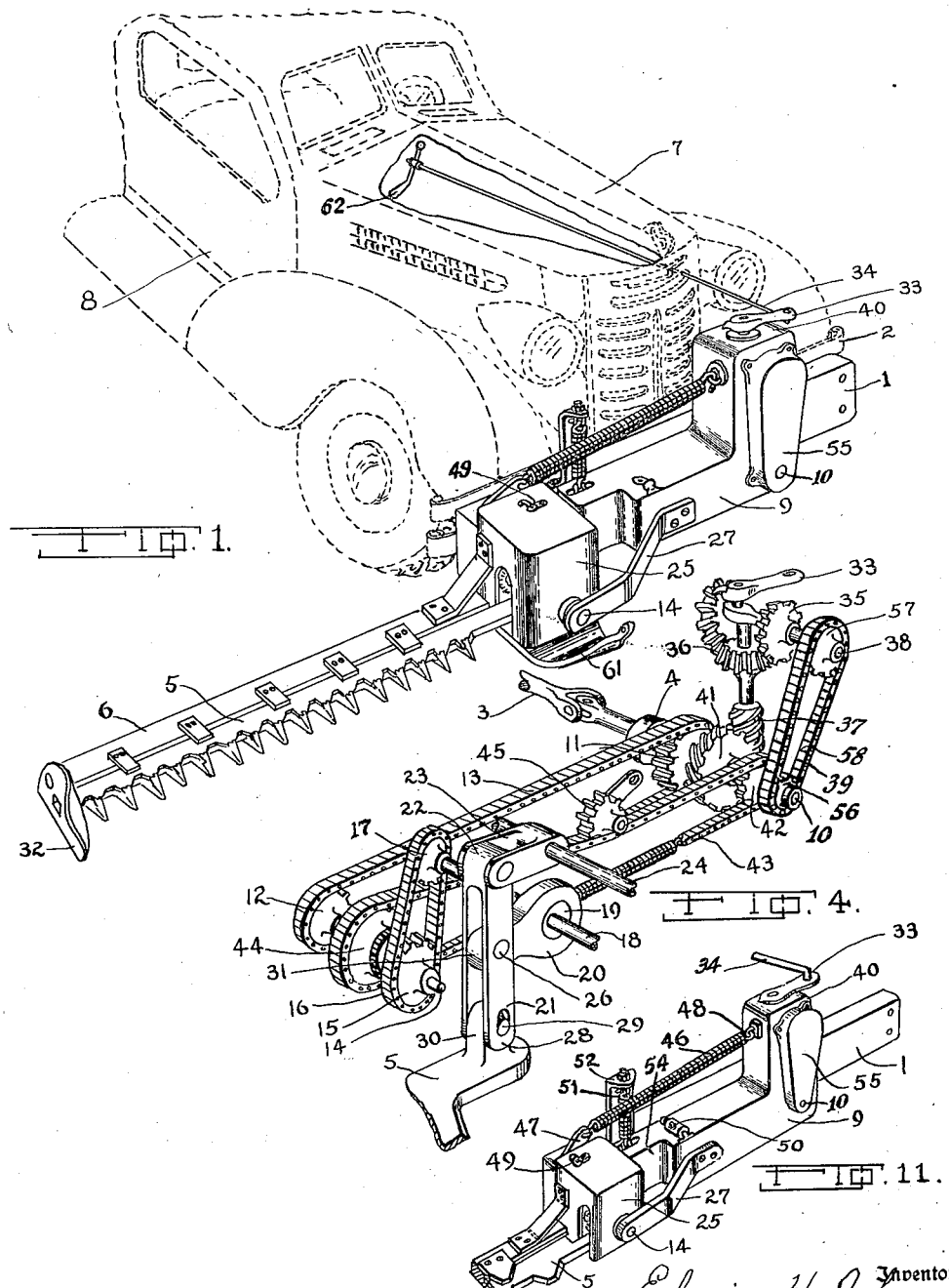

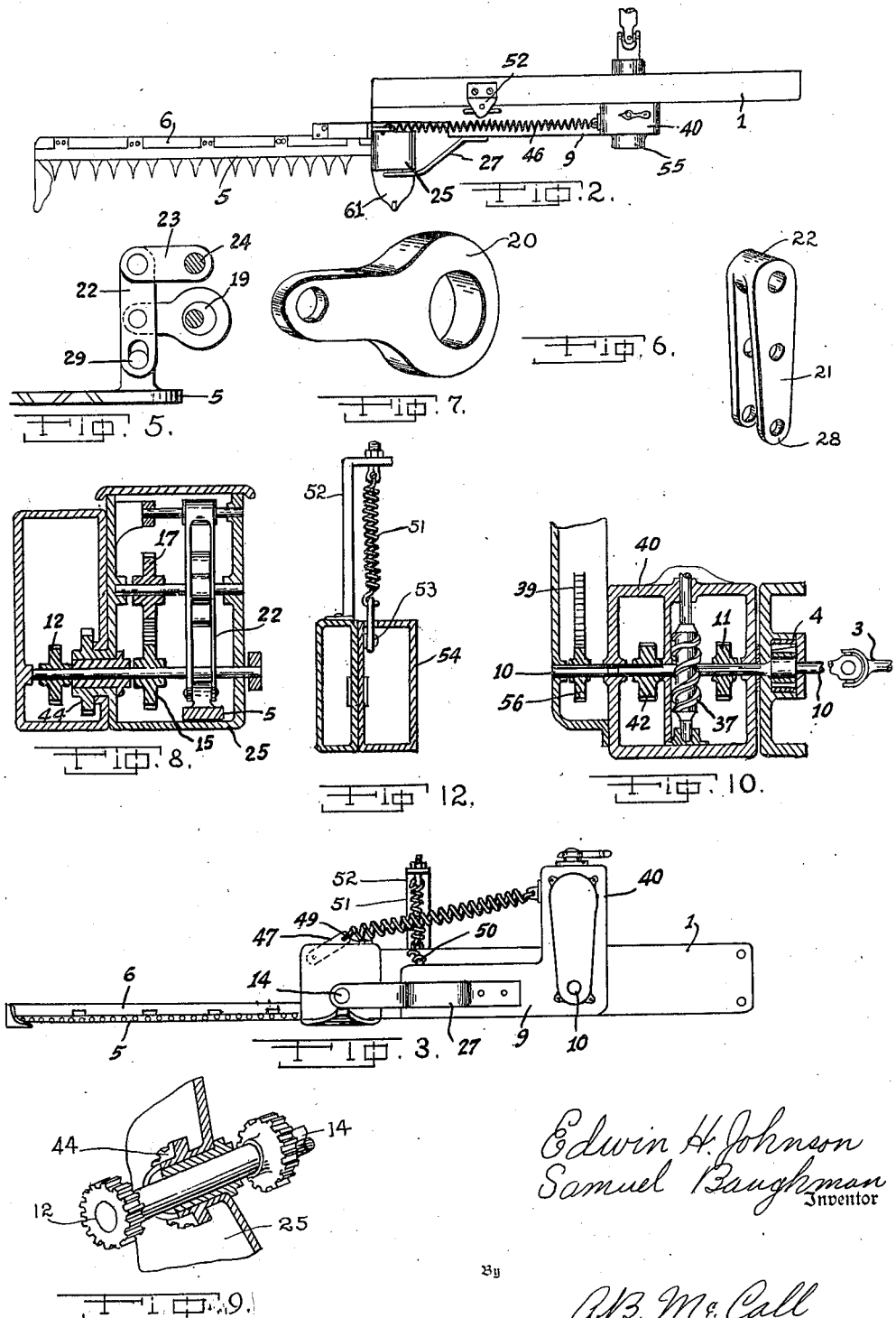

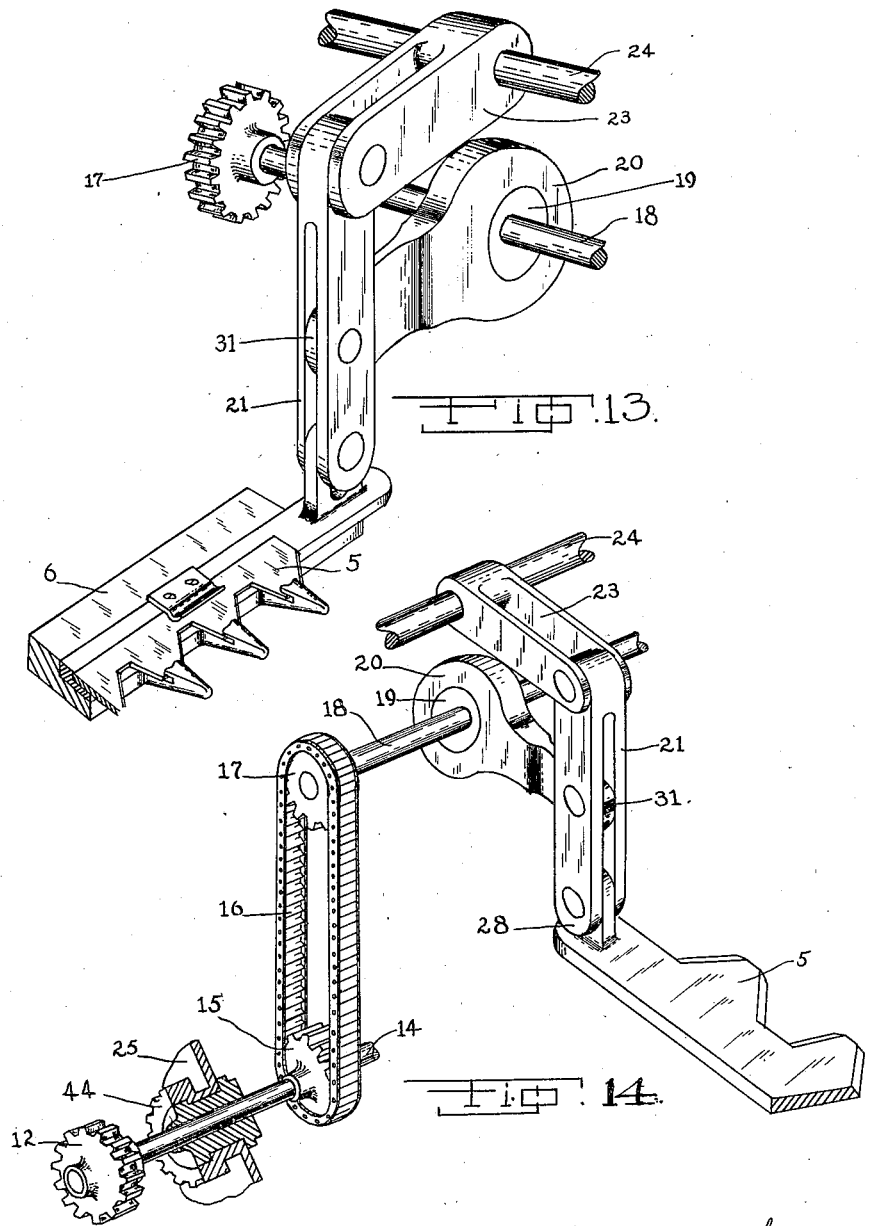

2,285,117

UNITED STATES PATENT OFFICE 2,285,117

MOWING ATTACHMENT FOR TRUCKS

Edwin H. Johnson, Lincoln, and Samuel Baughman, Broadwell, Ill., assignors of one-third to Robert W. Sheets, Lincoln, Ill.; Bernice G. Baughman, administratrix of said Samuel Baughman, deceased Application May 12, 1939, Serial No. 273,178

1 Claim. (Cl. 56—25)

Our invention relates to machines for mowing grain, grass, timothy, weeds and the like; an object being in our invention to provide a mowing attachment for tractors, trucks, automobiles and the like where such vehicles are provided with a power take-off.

A further object of our invention is to provide a mowing attachment for such vehicles as will be capable of operating its cutting sickle at any selected angle within the range of the limits of its pivotally adjustable capacity and to be able to make selected adjustments in the operating position of the cutting sickle, while the sickle is running, with such adjustments easily made from the driver's position on the vehicle carrying the attachments, with the driving power for the mowing attachment coming from the vehicle engine through a power take-off.

A further purpose of our invention is to provide a mowing attachment for trucks, tractors and the like, with the driving power therefor coming from the vehicle motor and selectively controlled from the driver's position in the vehicle with means in the mechanical construction of this attachment by which the sickle bar and sickle may be pivotally lifted while running at any desired angle of pivoted elevation to meet the needs in its adjustment when mowing over hilly, rough, and uneven ground surfaces.

A further purpose of our invention is to provide an easy and convenient means for lifting the cutting sickle and driving mechanism by mechanical power derived from the vehicle engine through the power take-off thereof; and with this lifting means to provide spring members for resiliently reducing the lifting strain falling upon the mechanical lift means whether it be a hydraulic lift or a worm gear lift or other suitable types of lifting devices, any of which may take their lifting power from the vehicle engine through a power take-off connected therewith.

We attain the objects of our invention by the mowing attachment described in this specification wherein the drawings connected therewith are utilizing reference numerals to facilitate a comprehensive description of the invention.

Referring to the drawings:

Fig. 1 is a perspective illustrating the mowing attachment of our invention when operatively connected with a car.

Fig. 2 is a top view of our invention.

Fig. 3 is a front view of our mowing attachment.

Fig. 4 is an isometric view showing in connected detail the operating mechanism of our invention with housings removed.

Fig. 5 is a detail illustrating the cam action which drives the sickle in the sickle bar.

Fig. 6 is a detailed perspective of the rocker arm controlled by the cam.

Fig. 7 is a perspective of the collar which rides the cam.

Fig. 8 is a sectional view of the mechanism directly controlling the sickle movements.

Fig. 9 is a perspective of the sickle driving shaft and sprockets.

Fig. 10 is a detailed view of the drive shaft connection with the sickle driving and sickle lifting mechanism of our invention.

Fig. 11 is a detail showing the spring connections adapted to facilitate or ease the lift operation which pivotally elevates the sickle and sickle bar when the worm gear or hydraulic lift elevates the same.

Fig. 12 is a detail in section illustrating the upright balancing spring facilitating the lifting and sustaining support of the mechanism and its pivoted housing.

Fig. 13 is a detailed perspective of the sickle driving cam and its operative connections as viewed from a position above the level of the sickle and in front of the same.

Fig. 14 is a perspective of a cam operating mechanism as observed from a position behind the sickle.

Figure 15:
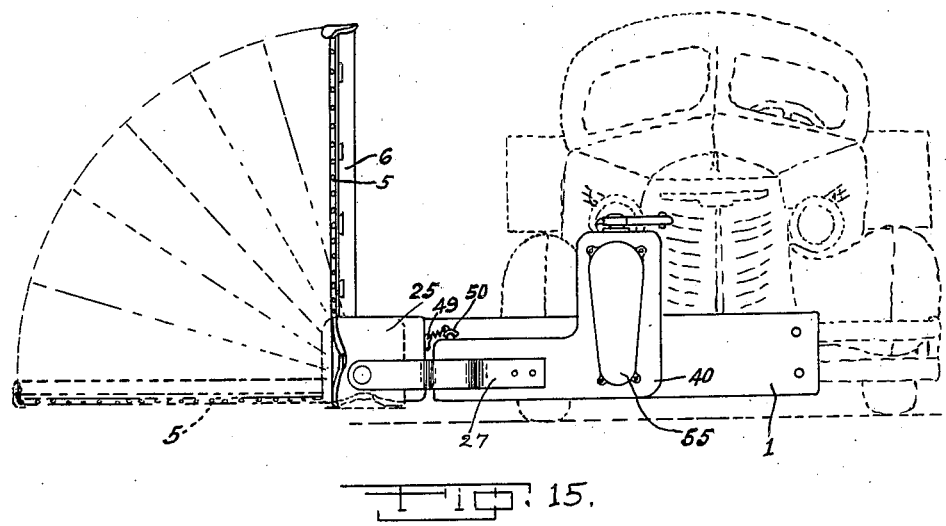
Fig. 15 is a front view of our invention showing the cutting sickle operating in a vertical plane.

We shall now describe in detail the novel and salient features of our invention as we set forth the construction and preferred manner of operating the same.

Those engineers and mechanics who have had extensive experience in this art are perhaps familiar with the various problems arising as obstacles in the way of successful operation of mowing devices adapted to be operatively and detachably connected with vehicles of some sort for movably supporting the mowing attachment, when it is in use.

Some of these difficulties in the way of successful operation of mowing attachments for vehicles amounts to a problem in the economy of manufacture; while other difficulties are found in an attempt to provide a substantial, economical and convenient means of attaching and supporting the mowing attachment on such vehicles as may be desired to carry it. Still other problems have arisen in the design of such attachments making them impractical as a means of cutting grass, weeds and the like along the road-side and in other situations where the ground surface is uneven, hilly and rough.

An outstanding feature of our invention is its construction and design which permits the cutting sickle not only to work at any practical operating angle lower than a horizontal position up to a vertical position, but a construction which will permit a change in the operating angle of the sickle while the sickle is running.

We shall now try to present a comprehensive description of our mowing attachment as we refer to the drawings wherein reference numerals referring to the same part will be alike in the different figures.

In this description we are not illustrating the complete structure of a power take-off operating on such a vehicle as may carry our mowing attachment for the reason that such a power take-off is a well-known mechanical convenience. We are however showing a portion of a driving rod through which our mowing attachment secures its driving power from the vehicle engine through its power take-off.

For instance, we provide in our invention a mounting plate 1 for the operative support of our mowing attachment at the front end of a truck, tractor and the like, preferably secured detachably to a forward bumper 2 of the vehicle.

Driving shaft 3 securing its power from the vehicle engine through a power take-off (not shown) connects with mounting plate 1 through a bearing 4.

For instance, in a mowing device which may be successfully used along a highway with the greatest convenience and satisfaction, it is obvious that the uneven ground surface along the road shoulder would make it essential that means be provided permitting the sickle to be changed from one position of pivotal elevation to another as the ground surface may require, while the mower is running without making any stops to do so.

Cutting sickle 5 oscillates in sickle bar 6 and receives its driving power from the engine 7 of a truck, tractor or other suitable traction means 8; but this driving power for sickle 5 is carried through the drive shaft of the vehicle motor over to a driving rod 3 of our mowing attachment through a power take-off unit (not shown).

This driving rod 3 for the mowing attachment is carried in bearings from the power take-off of the vehicle out to mounting plate 1, and through bearing 4 therein including the mechanism housing 9 and becoming shaft 10.

Thus in the operating control of sickle 5 the driving power therefor is carried from driving rod 3 which carries sprocket wheel 11 to driving sprocket 12 through sprocket chain 13. Sprocket wheel 12 is secured to sprocket shaft 14 which carries a driving sprocket 15; while a sprocket chain 16 establishes driving connection between driving sprocket wheel 14 and sprocket wheel 17 which is fixed in its support upon driving shaft 18.

Eccentric cam 19 is fixed on shaft 18 which is rotated by the action of sprocket chain 16 connecting sprockets 15 and 17. When sickle 5 is selectively elevated or lowered pivotally, such pivotal adjustments cause shaft 18, parallel with shaft 14, to move about shaft 14. These adjustments may be made in the operating position of sickle 5 during the active oscillating movement of the same. Collar 20, riding cam 19, thus actuates the oscillating movement of sickle 5 as will be noted in Figure 4. Shaft 24 secured to the inner walls of housing 25, will thus be pivotally moved with housing 25, about shaft 14.

A lever arm 47, shown in Figure 11, is the means of attachment for the resilient spring 46 or a hydraulic plunger 60, adapted to make easier a lifting adjustment of housing 25 with sickle 5 and its control sprockets.

It is important to note that shaft 14 extends through housing 25 which houses cam 19, rocker arm 21 and control connections.

In fact, this housing 25 being pivoted upon shaft 14 from which cam 19 receives its driving power is one essential detail of construction in our invention for the reason that driving power for actuating sickle 5 may easily be carried to sickle 5 through shaft 14, sprocket chain 16, shaft 18, cam 19, collar 20, and pivotal connection 26 with rocker arm 21 without, in any manner, interfering with the normal function of any of these parts.

Thus, when sickle bar 6 is pivotally adjusted with sickle 5 about shaft 14, then this sickle, because of this detail of construction, will successfully oscillate at any desired tilting angle from a position somewhat below horizontal up to a vertical position, if desired.

A bracing bracket 27 establishes a supporting connection between housing 25 and shaft 14 for the pivotal strengthening of the support of housing 25 and the cam operating mechanism therein which controls sickle 5.

It will be noted that yoke 23 supported on shaft 24 is provided for pivotally holding rocker arm 21 at its top end 22 directly over the middle point of the oscillating limits of the movement of the lower end 28 of rocker arm 21, which end pivots to sickle 5 by a pivot pin 29 either working in a slot of rocker arm 21 or a slot in connecting lug 30 of sickle 5.

It will be noted that cam collar 20 has a driving shank 31 connecting with pin 26 in rocker arm 21. When sickle 5 and its supporting sickle bar 6 are thus tilted in their pivotal support about shaft 14, then this entire cam control mechanism pivotally moves about shaft 14 as the free end 32 of sickle bar 6 is elevated or lowered and this pivotal adjustment does not in any way change the operative relation of the cam control members in housing 25.

In a study of the drawings, it will be observed that it is desired to not only control the cutting sickle from the driver's position in the vehicle but it is also desired to control the pivotal adjustment of the cutting sickle and cutting bar from the driver's position either when the mowing attachment is running or when it is still.

Within the scope of our invention, we desire to control this tilting adjustment of sickle 5 either by a worm gear control or a hydraulic lever.

For instance, when the driver wishes to adjust sickle 5 in its respective tilting positions he may adjust a control lever 62 near his driving position, which establishes connection with the adjustment lever 33 through control rod 34 for the purpose of drawing gear 35 into meshing engagement with gear 36 causing the rotation of worm gear 37 as the power coming through driving rod 3 and shaft 10 is carried up to shaft 38 through sprocket chain 39.

It will be noted that an upright portion 40 of housing 9 is adapted to house this worm gear 37 and its control connections.

When worm gear 37 rotates its connecting gear 41 this rotation carries with it sprocket wheel 42 which is fixed in its relation with gear 41 as they move about shaft 10 directly connected with drive rod 3.

A sprocket chain 43 establishes a lifting connection between sprocket wheel 42 and sprocket wheel 44.

Thus when worm gear 37 causes the rotation of sprocket wheel 44 through the pull exerted by sprocket chain 43 the result will be a pivotal adjustment in housing 25 about shaft 14 extending through it.

Drive rod 3 connects by universal joint construction with shaft 10. Gear 41 and sprocket 42 are operatively integral, but are carried rotatably loose on shaft 10. Worm gear 37 meshes with gear 41 controlling sprocket 42, which in turn controls lift chain 43, actuating sprocket 44 for a lifting adjustment in housing 25.

It will be noted that a sprocket 56 controlled by shaft 10 may either be connected with that shaft by a universal joint, or through a spur gear connection with shaft 10 to provide for a slight offset of sprocket 56. This is necessary to permit bevel gear 35 on shaft 38, which carries sprocket chain 39 to sprocket wheel 57, to mesh properly with bevel gear 36, to effect the desired rotation of worm gear 37 in its control of lifting chain 43 through gear 41 and sprocket 42.

Sprocket chain 43 may be tightened or loosened by an adjustment in the position of idler sprocket 45.

In a study of this lifting mechanism which utilizes worm gear 37, it will be observed that it would be an excessive strain on sprocket chain 43 as well as other gears and sprockets utilized in this lifting operation to try to pivotally lift sickle bar 6 with sickle 5 when only utilizing the worm gear and its sprocket connections for this purpose; but in order to avoid such a mechanical strain on the sprocket wheels and chain, we have provided a relatively strong spring 46 establishing a resilient connection between upright housing 40 and lever 47 secured to housing 25. The tensile strength of spring 46 may be selectively varied by an adjustment 48.

Thus, when sickle 5 is pivotally adjusted in its selected positions of elevation by the driver's control of worm gear 37 by adjusting lever 33 the spring 46 automatically comes into play as a very effective means of facilitating the lifting operation.

The mechanism housing 9 may obviously be shaped in any suitable manner that will house and protect the sprocket wheels and sprocket chains, protected thereby, but it is essential that in the assembly of this mowing attachment, the shape of this housing 9 must not be such as will permit it to get in the way of housing 25 when it is pivotally tilted on shaft 14.

Housing 9 is pivoted on mounting plate 1 with its pivotal axis defined by shaft 10.

It will be noted that when sickle 5 is lifted far enough toward a vertical position then a resilient hook 49 on housing 25 will be stretched by hand to resiliently engage a pin 50 on housing 9.

It will be observed that we provide an upright spring 51 secured at the top on a bracket 52 and secured at the bottom on an anchoring pin 53 (see Fig. 12). This is is a tensile spring having the function of an automatic lift upon the free end 54 of housing 9 and this is provided to permit this free end of housing 9 to resiliently float in its operative position pivotally supporting the cutting sickle 5 and its sickle bar 6 with the cam control housing in housing 25.

This spring 51 has a tendency to provide a flexible support for this free end 54 as it holds the pivoted sickle 6 at the level desired of it.

Thus, it is seen that the lifting operation for tilting housing 9 or sickle 5 may be easily controlled from the driver's seat as he sits in the cab of vehicle 8, which operatively supports our mowing attachment.

Housing 55 protects sprockets 56 and 57 as well as sprocket chain 68.

It will be further noted that when our mowing attachment is in operation, then the inner ground shoe 61 is secured to housing 25 to guard and protect housing 25 while the terminal plate 32 on sickle bar 6 protects the end of this bar.

Figure 16:
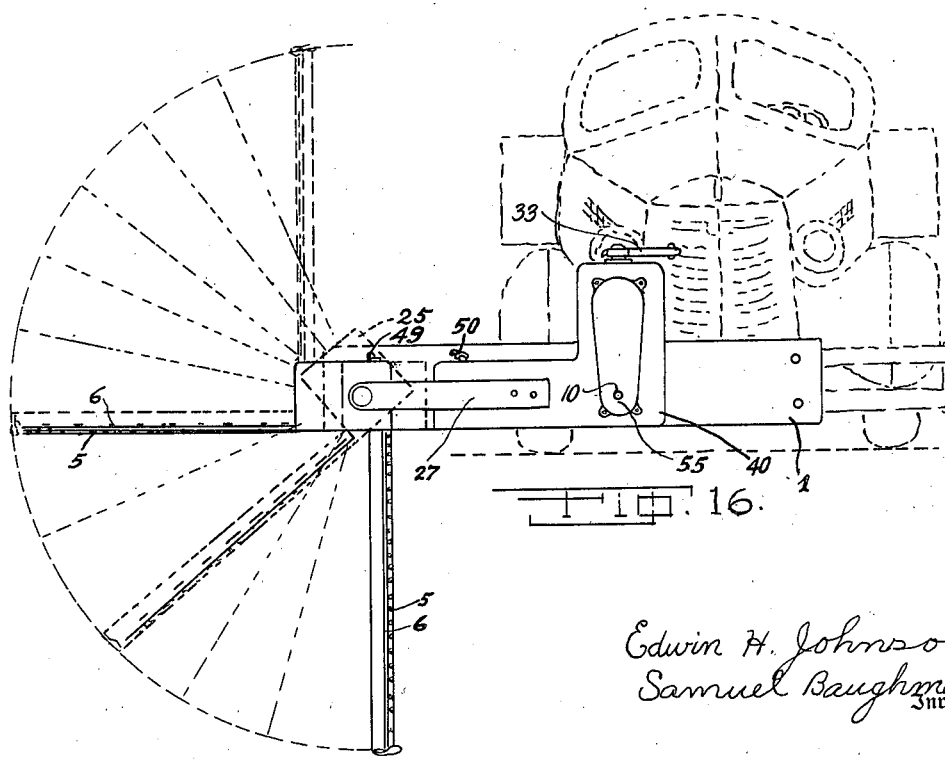
Fig. 16 is a front view of our invention with the cutting sickle operating substantially below horizontal.

It will be observed in Fig. 15 that our mowing attachment for trucks, tractors, automobiles and the like, will very successfully operate with the cutting sickle reciprocating in a vertical plane as well as horizontal. In Fig. 16, it will be observed that our mowing attachment in its operative construction will permit the sickle to successfully work at a very substantial angle below horizontal and even if necessary in a vertical plane downward.

In a careful analysis of our invention, it will be observed that certain minor changes may be made in some of the details of construction thereof without departing from the scope of our invention, but having carefully pointed out the details of construction of this invention, as we prefer to utilize it, what we claim is:

A mowing attachment for trucks, tractors, and the like, having a power take-off operatively connected with the front mounting for the attachment on such vehicle, a mowing sickle operatively carried by said vehicle and operatively pivoted to said front mounting means, an eccentric cam drive for said sickle, a housing for said drive, a sprocket shaft extending through said housing and pivotally supporting the same, a shaft supported yoke, a rocker arm carried by said yoke, said sickle pivotally connected to the bottom end of the rocker arm for an oscillating movement, a cam collar, pivotally carried by said rocker arm and establishing a drive connection between said sickle through said cam and said rocker arm, selectively adjustable sprockets and sprocket chains operatively connected therewith for the control of said sickle, a drive shaft connected with said power take-off, a loose running sprocket carried by said drive shaft and an integral gear therewith, an upright worm-gear meshing with said integral loose running gear, a lifting chain establishing a lifting control connection between said housing and said loose-running sprocket, a bevel gear uprightly disposed and integral with said worm gear, a pair of spaced sprocket wheels establishing operative connection between said drive shaft and said upright bevel gear through a sprocket chain and a selectively adjustable second bevel gear adapted to mesh with the first, for the selective control of said lifting chain, and a resilient spring connecting said housing with said lifting chain mechanism for easing the lifting operation.

EDWIN H. JOHNSON.
SAMUEL BAUGHMAN.